United States Patent [19]

New

[11] Patent Number: 5,319,274
[45] Date of Patent: Jun. 7, 1994

[54] MAGNETIC BEARINGS WITH TWISTED LAMINATIONS

[75] Inventor: Nigel H. New, Harrow, United Kingdom

[73] Assignee: The Glacier Metal Company Limited, Middlesex, England

[21] Appl. No.: 960,400
[22] PCT Filed: Jul. 29, 1991
[86] PCT No.: PCT/GB91/01283
    § 371 Date: Jan. 15, 1993
    § 102(e) Date: Jan. 15, 1993
[87] PCT Pub. No.: WO92/02738
    PCT Pub. Date: Feb. 20, 1992

[30] Foreign Application Priority Data

Jul. 28, 1990 [GB] United Kingdom ............ 9016627

[51] Int. Cl.$^5$ ........................................... H02K 7/09
[52] U.S. Cl. .................................. 310/90.5; 310/152
[58] Field of Search ............ 310/90.5, 152, 154, 310/156, 193, 191; 384/113, 107

[56] References Cited

U.S. PATENT DOCUMENTS

| | | | |
|---|---|---|---|
| 2,312,101 | 2/1943 | Killam et al. ............... | 310/156 |
| 2,704,231 | 3/1955 | Goldsmith ................. | 310/90.5 |
| 2,725,266 | 11/1955 | Mendelsohn ............... | 310/90.5 |
| 4,180,296 | 12/1979 | Habermann ................ | 308/10 |
| 5,204,572 | 4/1993 | Ferreira .................. | 310/90.5 |
| 5,220,232 | 6/1993 | Rigney, II et al. ......... | 310/90.5 |

FOREIGN PATENT DOCUMENTS 2574880 11/1986 France .

OTHER PUBLICATIONS

Patent Abstracts of Japan, vol. 7, No. 126 (M-219)(1271), May 31, 1983 & JP, A, 58 042 824, (Daini Seikosha), Mar. 12, 1983.

Primary Examiner—Steven L. Stephan
Assistant Examiner—D. R. Haszko
Attorney, Agent, or Firm—Nixon & Vanderhye

[57] ABSTRACT

Laminated stator and rotor components for a magnetic thrust bearing each include a plurality of generally radially directed laminations (10) whose roots lie along the axis of rotation of a shaft located by the bearing and whose distal portions are progressively twisted relative to the axis such that the width of any lamination (t, t') at any given radial distance from the root corresponds to at least the circumferential separation between adjacent laminations at that distance.

5 Claims, 2 Drawing Sheets

$$t' = \frac{t}{SINy} = t \times \frac{R_c}{R_s}$$

MAGNETIC BEARINGS WITH TWISTED LAMINATIONS

TECHNICAL FIELD

This invention relates to magnetic bearings and is in particular concerned with thrust bearings for use in conjunction with rotating shafts.

BACKGROUND PRIOR ART

It is well-known to support a rotatable shaft by means of a magnetic bearing. It is also known to control the axial displacement of such a shaft by means of a magnetic thrust bearing, as opposed to a conventional thrust race. A magnetic thrust bearing comprises a rotor mounted on the rotable shaft whose axial displacement is to be regulated and at least one fixed stator element mounted to associated hardware. The stator element has associated with it the energising windings whereby the position controlling force is generated, and regulated, typically under the control of electronic sensing-/positioning circuitry. It is usual to manufacture the rotor component from solid, iron-based alloys and the same material may be used for the stator element or elements. This is acceptable where the thrust load is fairly static and the rate of change of flux is not a significant factor.

However, where there are dynamic load changes accompanied by a high rate of change of flux, solid magnetic components are undesirable because of the eddy currents developed. These result in high power loss and very significant heating of the bearing components. Accordingly, a laminated construction is preferred for such applications, but if such a construction is to be effective, simple radially-directed laminations are unsatisfactory because of the reduction in magnetic surface area in the progressively radially outward direction. It will be noted that a typical lamination thickness is on the order of 0.1 to 0.25 mm. Wedge shape laminations are not a satisfactory solution, because of this fact. One proposed solution is to increase the diameter of the co-operating components, though this does not really address the further problem which arises when the respective rotor and stator laminations do not actually align with one another at their outer periphery. Where there is no alignment, there will be a high reluctance; where there is alignment, there will be a low reluctance. The overall effect is one of rapid changes leading to higher winding losses and to the generation of high frequency transients in the windings.

It is an object of this invention to minimise these problems.

SUMMARY OF THE INVENTION

According to this invention, laminated stator and rotor components for a magnetic thrust bearing each comprise a plurality of generally radially directed laminations whose roots lie along the axis of rotation of a shaft located by the bearing and are characterised by the distal portions of said laminations being progressively twisted relative to said axis such that the width of any lamination in a circumferential direction at any given radial distance from the root corresponds to at least the circumferential separation between adjacent laminations at that distance.

By progressively twisting individual laminations about their point of attachment to a central hub or other support, the effective radial gap between them is minimised, without increasing their thickness. In other words, the effective area of metal as seen in an axial direction is maximised, in contrast to that achieved by radially aligned flat laminations. Preferably the laminations of the stator element are twisted in the opposite sense to those of the rotor, to enhance their mutual alignment in use.

In order that the invention be better understood, an embodiment of it will now be described with reference to the accompanying drawings.

DETAILED DESCRIPTION OF THE DRAWINGS

Figure 1:
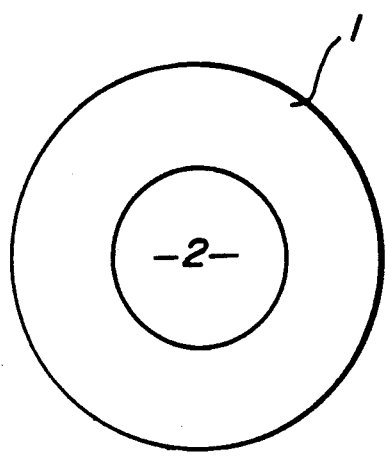
FIGS. 1, 2 and 3 illustrate prior art constructions.

FIG. 1 is a side view of a solid metal thrust collar 1. In use, it is mounted on a central shaft 2, and disposed between a pair of corresponding shaped stator elements provided with energising windings (not shown or further discussed here). The stator elements would in this case also be of solid metal, and provided with annular recesses for the windings. Such an arrangement might be used for light duty applications, particularly where stable and relatively modest axial thrust forces are generated.

Figure 2:
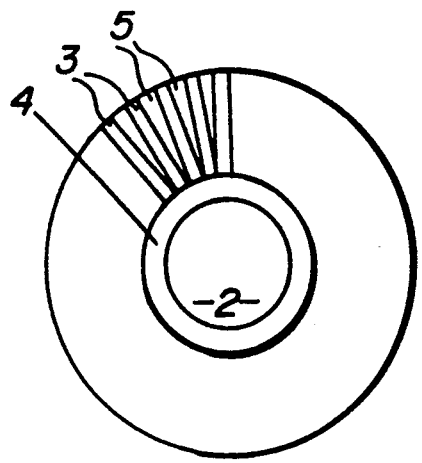

FIG. 2 shows a simple laminated thrust collar 2 corresponding to FIG. 1, but having a plurality of radial laminations 3 supported by a central hub 4. It will be noted that the radially outermost tips of these laminations are separated by generally triangular gaps 5, which would in practice be filled with a magnetically inert material such as an epoxy or phenolic resin composition.

Figure 3:
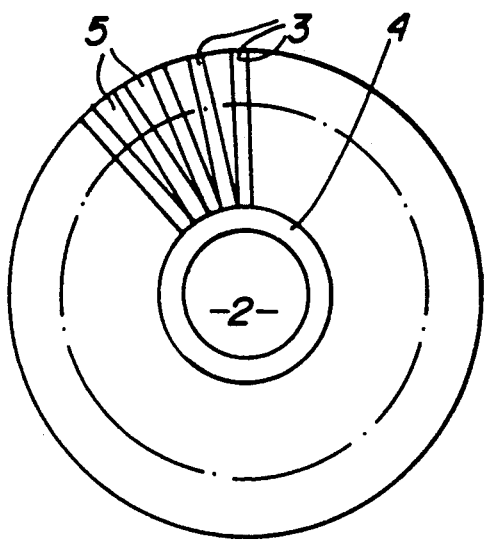

FIG. 3 illustrates how the collar of FIG. 2 would need to be increased in diameter in order to achieve the same effective magnetic area as that of the solid collar of FIG. 1. As only the diameter is changed, the same reference numerals as FIG. 2 have been used.

Figure 4:
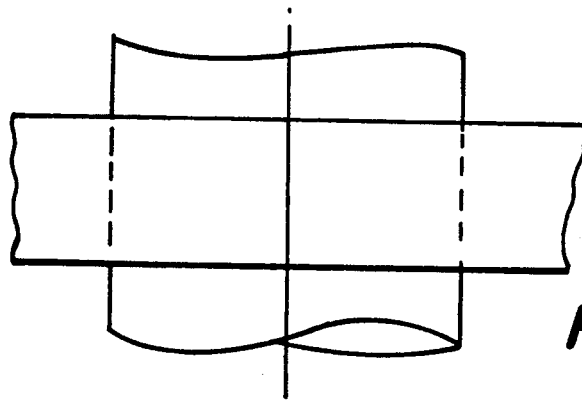
FIGS. 4 and 4A–4D illustrate the present invention.
Figure 4A:
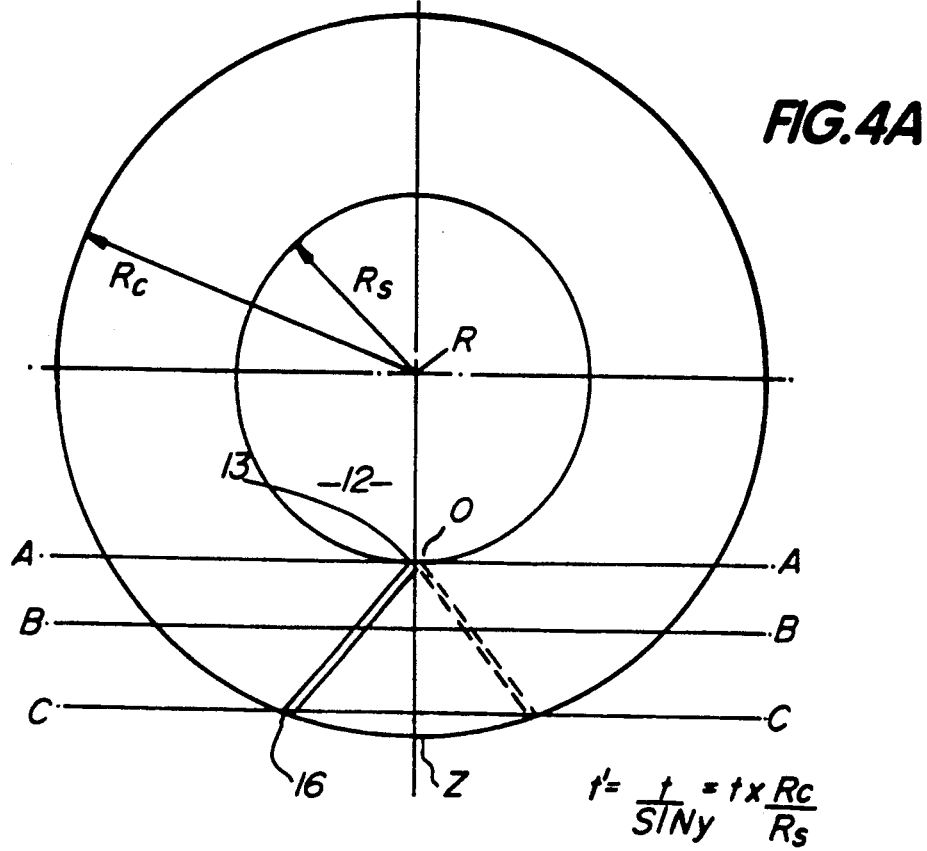
Figure 4B:
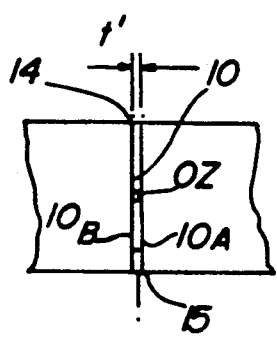
Figure 4C:
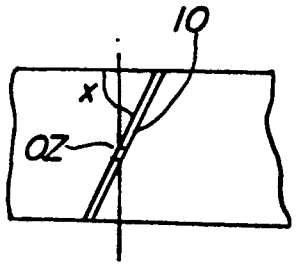
Figure 4D:
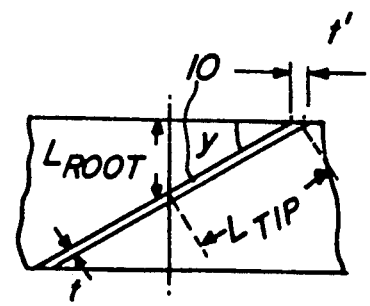

FIG. 4 is in several parts. FIG. 4A is a cross-sectional side view taken along the axis of rotation. FIGS. 4B–4D inclusive are sectional views of the same part of FIG. 4A, but as seen at different radial displacements from the axis of rotation.

Referring also to FIG. 4B, a single lamination 10 is shown representing one of a plurality of laminations arrayed about the axis of rotation R. The (and each) lamination is parallel-sided and of uniform width t between the sides. The root 13 of the lamination is at a radial distance $R_s$ from the axis of rotation and the plane of the lamination of the root extends in a direction parallel to the axis of rotation. The plane of the lamination is bisected between its ends 14, 15, defining faces of the collar of laminations, by a central axis OZ extending radially of the axis of rotation from the root at radial distance $R_s$ to a tip 16 at radial distance $R_c$.

Thus in FIG. 4B, at a radial distance Ra or Rs, the width of the lamination (in a circumferential direction) is t, and in a conventional lamination its effective magnetic area would be t multiplied by (Rc−Rs) the radial depth from the hub 12 to the outer rim. In accordance with the present invention, the plane of each lamination between the root and tip is twisted progressively in one directional sense about the central lamination axis OZ as a function of radial distance. FIG. 4C shows the same lamination, but this time in section on line BB at a radial distance Rb. In this case, because of the progressive twist from the disposition shown in FIG. 4B, the effective width t' in the circumferential direction perpendicular to the axis of rotation is now t/sin x, where x is the angle relative to the face of the collar. It will be seen that t' is t. Rb/Rs, the effective area being increased over that of FIG. 4B by the factor Rb/Rs.

At the radially outermost point, as seen in FIG. 4D along line CC at radial distance Rc, the angle relative to the face of the collar is y and the value of t' is now t.Rc/Rs.

Rc is greater than either Ra or Rb, so the effective width of the lamination in a circumferential direction, that is, when viewed along the axis of rotation, increases with radial distance and the effective area of the lamination end facing an adjacent component is greater and accordingly, the overall performance achieved by progressive twisting is much closer to that of a solid collar such as that of FIG. 1 than is that of the simple flat radial assembly of FIG. 2.

In use, where a rotor component constructed in accordance with the invention is to be used with a stator component also constructed in accordance with the invention, such that the end faces of the lamination arrays or collars face each other, the laminations of the rotor component may be twisted about the central lamination axis in an opposite sense to those of the stator components to maximize their mutual alignment.

It will be appreciated that the arrangement of FIG. 4 could be used with wedge shaped (in side view) laminations since although the root width is fixed by the hub dimensions, twisting reduces the axial thickness of the assembly. Accordingly, wedge shaped laminations may be used to counteract this. FIG. 4 does in fact assume that this particular constructions is used.

I claim:

1. A laminated component for providing one of a pair of stator and rotor components associated with a magnetic bearing operable to locate a shaft rotatable about an axis of rotation, said component comprising a plurality of parallel sided laminations of uniform width between said sides, arrayed about the axis of rotation of the shaft, each lamination being fixed with respect to the shaft at a root spaced from said axis of rotation and having a central lamination axis, bisecting a plane of the lamination between ends thereof, extending radially of the rotation axis from the root to a tip of the lamination, the plane of the lamination at the root extending parallel to said axis of rotation, the plane of the lamination between said root and tip being twisted progressively in one directional sense about said central lamination axis as a function of radial distance from the root to increase an effective width of the lamination, measured in a circumferential direction, over said uniform width of the lamination between the parallel sides perpendicular to said plane.

2. A component as claimed in claim 1 in which the each lamination is twisted about said central lamination axis such that the plane of the lamination at said tip is inclined about said central axis with respect to the plane of the lamination at the root by an angle substantially equal to $\cos^{-1}(R_{root}/R_{tip})$ with $R_{root}$ being a radius along said central axis from said axis of rotation to the given lamination root and $R_{tip}$ being a radius from said axis of rotation to the lamination tip.

3. A laminated component as claimed in claim 1 providing a stator component in combination with another component as claimed in claim 1 providing a rotor component wherein the laminations of the rotor component are twisted with respect to the root about said central lamination axis in an opposite directional sense to those of the stator component.

4. a magnetic thrust bearing operable to locate a shaft rotatable about an axis of rotation, including a pair of stator and rotor components each comprising a laminated component as claimed in claim 1.

5. A component as claimed in claim 2 in which the length $L_{tip}$ of the lamination from the central axis to an end thereof at the tip is longer than the length $L_{root}$ of the lamination from the central lamination axis to said end at the root, in the ratio $L_{tip}/L_{root} = R_{tip}/R_{root}$, whereby said end of the lamination between the root and tip lies in a plane extending orthogonally to said axis of rotation.

* * * * *